United States Patent [19]
Robertson

[11] Patent Number: 4,806,741
[45] Date of Patent: Feb. 21, 1989

[54] ELECTRONIC CODE ENHANCEMENT FOR CODE READERS

[75] Inventor: John A. Robertson, Chillicothe, Ohio

[73] Assignee: Telesis Controls Corporation, Chillicothe, Ohio

[21] Appl. No.: 886,878

[22] Filed: Jul. 16, 1986

[51] Int. Cl.[4] .............................................. G06K 7/10
[52] U.S. Cl. .................................... 235/462; 235/463; 235/471; 382/12; 250/568
[58] Field of Search ............... 235/463, 470, 471, 472, 235/462; 382/34, 48, 50, 12, 27; 358/284, 285, 288; 250/566, 568

[56] References Cited

U.S. PATENT DOCUMENTS

| | | | |
|---|---|---|---|
| 4,001,780 | 1/1977 | Kikukawa et al. | 235/470 |
| 4,044,227 | 8/1977 | Holm et al. | 235/463 X |
| 4,047,152 | 9/1977 | Giuliano et al. | 382/50 |
| 4,468,809 | 8/1984 | Grabowski et al. | 382/50 |
| 4,499,578 | 2/1985 | Chittineni | 382/27 X |
| 4,525,859 | 6/1985 | Bowles et al. | 382/27 X |
| 4,544,264 | 10/1985 | Bassetti et al. | 358/284 X |
| 4,585,931 | 4/1986 | Duncan et al. | 235/463 X |
| 4,654,721 | 3/1987 | Goertzel et al. | 358/284 X |
| 4,680,457 | 7/1987 | Robertson | 235/463 X |
| 4,717,818 | 1/1988 | Brookman et al. | 235/463 X |

FOREIGN PATENT DOCUMENTS

| | | | |
|---|---|---|---|
| 2513605 | 10/1975 | Fed. Rep. of Germany | 235/471 |
| 2346778 | 12/1977 | France | 235/471 |

Primary Examiner—M. H. Paschall
Assistant Examiner—A. Jonathan Wysocki
Attorney, Agent, or Firm—Mueller and Smith

[57] ABSTRACT

An enhancement circuit for code readers of the variety employing a video input wherein transitions within each horizontal scan are detected and sampled for code correspondence. The enhancement develops a sequence of time spaced memory columns for each horizontal scan into which arithmetic values are submitted upon the occurrence of a transition and from which arithmetic values are decremented upon the failure of an occurrence of a transition. Thus, a statistical likelihood of occurrence of code component transitions is maintained in memory to electronically "stretch" the code components to enhance readability. Special cases are accommodated for for overrun and underrun conditions in the arithmetic adjustments which are carried out. A magnitude comparator functions to provide an output to the system representing an enhanced transition.

22 Claims, 6 Drawing Sheets

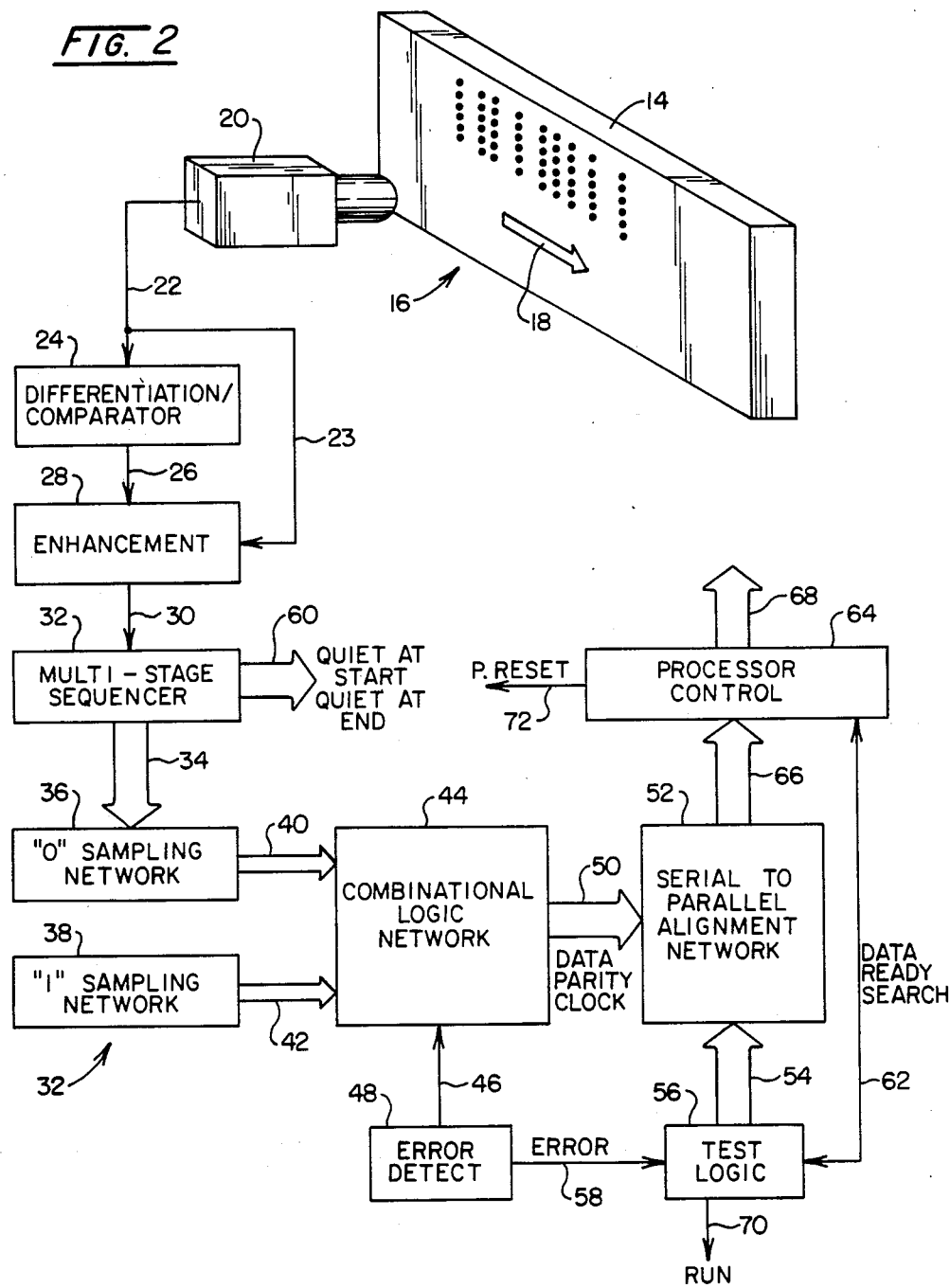

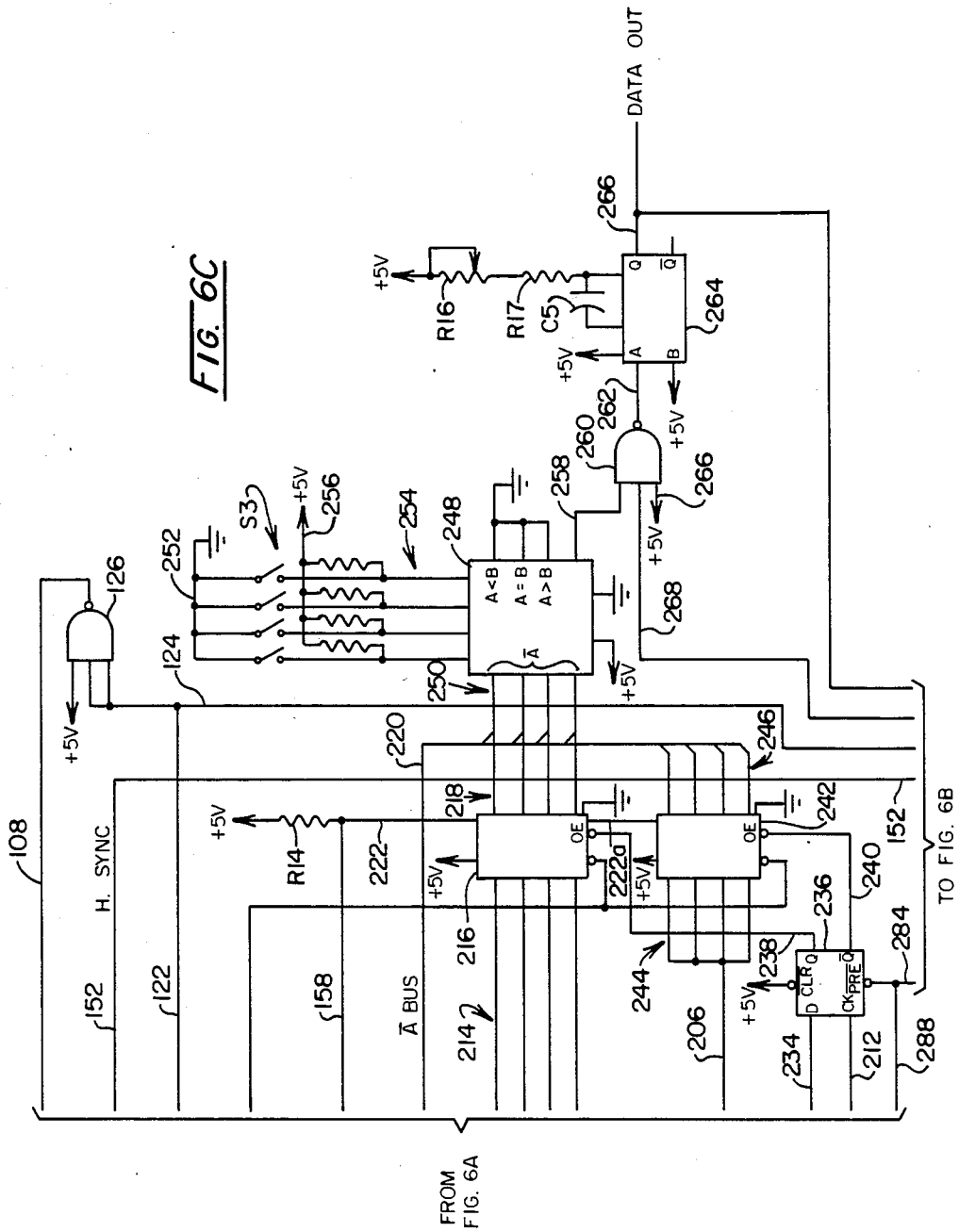

|  | ALU 162 | | | | | |
|---|---|---|---|---|---|---|
| CONDITION | S0 | S1 | S2 | S3 | CI (CARRY IN) | (MULTI-PLEXER 166 CONTROL) |
| DATA IN HAS POSITIVE EDGE PRIOR TO RISING CLK | 1 | 0 | 0 | 1 | 1 | 0 SELECT INCREMENT CODE |
| DATA IN HAS NO POSITIVE EDGE PRIOR TO RISING CLK | 0 | 1 | 1 | 0 | 0 | 1 SELECT DECREMENT CODE |

*FIG. 7*

| ALU 162 | | | | | | |
|---|---|---|---|---|---|---|
| S0 | S1 | S2 | S3 | CI | $\overline{F}$ | DESCRIPTION |
| 1 | 0 | 0 | 1 | 1 | $\overline{A+B+1}$ | INCREMENT A BY (B+1) |
| 0 | 1 | 1 | 0 | 0 | A−B−1 | DECREMENT A BY (B+1) |

*FIG. 8*

|  | ALU 162 | | | | | |
|---|---|---|---|---|---|---|
|  | S0 | S1 | S2 | S3 | CO (CARRY OUT) (OUTPUT) | DESCRIPTION |
| CASE 1 | 1 | 0 | 0 | 1 | 1 | INCREMENT COUNT WITH OVERRUN OF 4-BIT RAM 154 COLUMN MEMORY IN THE EVENT OF A WRITE |
| CASE 2 | 0 | 1 | 1 | 0 | 0 | DECREMENT COUNT AND A B WITH UNDERRUN OF 4-BIT RAM 154 COLUMN MEMORY IN THE EVENT OF A WRITE |

*FIG. 9*

ELECTRONIC CODE ENHANCEMENT FOR CODE READERS

BACKGROUND OF THE INVENTION

Industry has recognized an important need for implementing product tracking systems which perform essentially from the commencement of manufacture to the point of shipment of completed goods. For such tracking, an effective code and code reader system is required having a very high population capacity, as well as a capability for being read by reading devices. For example, a tire manufacturing facility may produce 40,000 tires per day with a need for separate codes on each tire item.

Bar codes have been widely employed in industry for the purpose of tracking. Generally, the codes are comprised of sequences of lines or bars located over or against a white or highly contrasting background. The bars are of selectively varying thicknesses and spacing so as to be machine readable. These codes require a relatively large number of bar components, typically 20 to 22 bars being employed. However, even with such detailed bar codes, a relatively limited number of code combinations become available, for example, in the range of about 65,000. This limitation fails to supply the needs of modern industry.

Industry further is looking to codes which are generated in a dot matrix form by ink jet devices which conventionally spray a sequence of spaced dots. In many industries, ink jet marking systems are not suitable for product tracking. For example, for many the delicate equipment for spraying inks will not withstand the environment and the inks themselves will not be capable of marking many products. A dot matrix form of marking device wherein the dots are formed by indentations in the material itself has been marketed by the Assignee hereof under the trade designation "Pinstamp". These devices are described in U.S. Pat. No. 4,506,999 entitled "Program Controlled Pin Matrix Embossing Apparatus" by Robertson. Ink jet printers initially were developed for man-readable alphanumeric codes wherein the discrete dots of a matrix symbol are somewhat broadly spaced. To generate bar codes with these existing dot matrix devices requires that the printers be modified such that the dots are created in mutual tangency to form a solid bar or, alternatively, that some form of reading be developed which is capable of tracking through a singular horizontal line of code spaced dots. If the latter can be accomplished, then the dot spacing configuration of the jet printing devices can be retained for both man readable codes, as well as bar codes and the number of codes which can be developed for a given region of product carrying the code will be greatly enhanced. Further, the code population can be expanded to significant numbers in the three hundred million range. However, even the slightest inclination or tilting of the product carrying the code during a reading procedure will cause typical readers to miss the requisite horizontal line of dots.

The reading of bar codes generally involves the optical scanning of a sequence of transitions exhibited by each code. For example, in the retail trade, as items carrying the bar coded labels are presented to the clerk or checker, they are passed over an optical scanner which employs laser optics for "reading" the code and transmitting the thus-read information to a computer. For effective and reliable operation, the goods carrying the coded labels are manipulated by the checker within the defined optical scanning region until a valid "read" is achieved. Generally, a short audible pulse indicates the reception of a valid read and the rate thus required for this reading procedure is of a slow enough level to permit a real time computer analysis of the code as it is being scrutinized bar by bar. However, where code readers are employed in general industry, several difficulties are posed, inasmuch as their relative positioning or placement on the subject being tracked necessarily varies from piece to piece. Thus, the reader device is called upon to locate the code and then read it without manipulation of the piece carrying the code. Further, this reading must take place at a very rapid rate so as not to disturb the speed of the production process involved. Recently, a code reader has been introduced to the marketplace which has the unique capability of successfully reading bar codes within rigorous industrial environments. The reader, marketed under the trade designation "Numbra" by the Assignee hereof, employs a video camera and carries out code scanning utilizing the horizontal scan lines of the video derived image. Through this technique, codes which vary considerably in their placement are readily read in very rapid fashion. A need now exists to adapt this code reading system to achieve a capability for reading bar codes formed by marking systems such a ink jet printers and indentation systems otherwise employed for forming dot matrix alpha-numeric characters. It is desirable that such adaptation also be employed to achieve a capability for reading conventionally formed bar codes which have been deformed or marred in the process of production.

SUMMARY

The present invention is addressed to apparatus and method for reading bar codes and, particularly to circuits and methods for electronically enhancing signals read which correspond with code components. With the invention, video based code readers may be effectively employed to read code images formed of dots and the like, as opposed to conventional bar architectures. Further, the code component enhancement technique finds application to improving the readability of defectively formed or damaged bar type codes.

Operating in conjunction with a video based code reader system, the enhancement approach of the invention functions to establish a timed sequence of 256 "memory columns" in conjunction with a corresponding sequence of horizontal scan lines of the video signal input. Transition signals representing code components occurring during each scan on the video raster are detected and, for each such detection, an arithmetic value present as a binary word is submitted to memory at an address corresponding with one of the aforesaid "memory columns". Conversely, where the interval of a given column is established and no transition representing a bar code component is detected for that interval, then an arithmetic value present as a binary word is decremented from the arithmetic value already in memory. Thus, a statistical likelihood of occurrence of a transition representing a code component is evolved and, in effect, the code is electronically "stretched" through any sequence of horizontal line scans as may be desired by the operator. Because the arithmetic binary word is of limited extent, for example, 4 bits, for some incrementations of the value in memory, there will occur a carry out bit. This may result in an error of incrementation. Thus, the circuit and method of the invention detects such special case and submits a predetermined equivalent maximum number to the memory in place of the incremented sum. Conversely, where a borrow out condition occurs in the course of decrementing the arithmetic word in memory, then a predetermined minimum value, for example, 0, is submitted to memory. Because the method employs a crystal oscillator for establishing the memory columns, an important stability is achieved, as well as an improved synchronization and control of the reader system. The inventive technique further permits the operator many adjustments over the video imaging region, allowing modulation of the degree of horizontal scan as well as vertical scan.

Another feature of the invention is to provide in a code reading system wherein imaging devices for imaging at least a portion of a code carrying object and generating a sequence of line scan defined image output signals of given duration having image transition signals occurring in a time space sequence corresponding with said code, and line scan synchronization signals, the code signal enhancement circuit improvement including an oscillator which is actuable for producing a time sequence of pulsed signals and a counter which is actuable to assume a clear condition and is responsive to the pulse signals for deriving a sequence of address signals from first to last. A memory is provided having a binary word access terminal and a sequence of address locations for selectively retaining arithmetic values and which is responsive to the address signals for providing arithmetic signals corresponding with these values at the address locations at the access terminal and is further responsive to the address signals and the arithmetic signals at the access terminal in the presence of a write enable condition to effect a retention of the arithmetic values corresponding with the arithmetic signals at the access terminal. A signal treatment is provided which responds to the image output signals for deriving presentment signals representing the state of the occurrence of the image signal transitions. An arrangement for deriving select arithmetic adjustment signals is provided and a logic circuit responds to the arithmetic signals at the access terminal, to the arithmetic adjustment signals and the presentment signals for varying the value of the arithmetic signals by the amount of the arithmetic adjustment signals selected with respect to the presentment signals to derive adjusted arithmetic signals at an output. A comparator responds to a select arithmetic threshold value and to the adjusted arithmetic signals for deriving an enhanced transition signal when the adjusted arithmetic signals exhibit a value at least as great as the threshold values. A distribution arrangement is provided for selectively conveying the adjusted arithmetic signals to the comparator and the memory.

Another feature of the invention provides a method for enhancing the response of code reading systems of the type employing an imaging device to image a code and generate a sequence of line scan defined image output signals having image transition signals occurring in a time spaced sequence corresponding with the code and having line scan synchronization signals which comprises the steps of generating a time sequence of pulsed signals from a crystal oscillator; generating a sequence of memory address signals from first to last in correspondence with the time sequence of pulsed signals; accessing a memory location having a predetermined binary word link capacity during the interval of each memory address signal; deriving a presentment signal representing the state of occurrence of an image transition signal in correspondence with the interval of each memory address signal; writing a binary word of first predetermined arithmetic value into each accessed memory location upon the corresponding occurrence of presentment signal representing the presence of a transition signal and, subsequently adjusting the first arithmetic value in correspondence with the presentment signal for subsequently occurring line scan defined image output signals to derive adjusted arithmetic signals with respect to the memory location; and comparing the adjusted arithmetic signals with a select arithmetic threshold value and deriving an enhanced transition signal when the adjusted arithmetic signals exhibit a value at least as great as the arithmetic threshold value.

A further feature of the invention provides a method for reading a code at the surface of an object provided as a word deriving sequence of radiation definable transitions selectively spaced in accordance with a predetermined ratio defining first-bit and second-bit information which comprises the steps of: imaging the surface with video device to generate a sequence of horizontal line scan defined image signals having transition signals occurring in a time space sequence corresponding with the code sequence of spaced transitions and having horizontal synch signals; generating a time sequence of pulse signals from a crystal oscillator; generating a sequence of memory address signals from first to last in correspondence with the timed sequence of pulse signals; accessing a memory location having a predetermined binary word length capacity during the interval of each memory address signal; deriving a presentment signal representing the state of occurrence of a transition signal in correspondence with the interval of each memory address signal; writing a binary word of first predetermined arithmetic value into each access memory location upon the corresponding occurrence of a presentment signal representing the presence of a transition signal and, subsequently adjusting the first arithmetic value in correspondence with the presentment signal for subsequently occurring line scan defined image output signals to derive adjusted arithmetic signals with respect to the memory location; comparing each adjusted arithmetic signal with a select arithmetic threshold value and deriving an enhanced output transition signal when the adjusted arithmetic signal exhibits a value at least as great as the arithmetic threshold value; applying the enhanced output transition signals as a train of pulses to a sequence of timing stages from first to a sampling to establish a sequence of pulse occurrence timing signals; applying a given timing signal associated with the sampling stage to a first sampling network having a valid first-bit condition during a first tolerance interval following a first interval corresponding with the time space sequence representing the first-bit select spacing; simultaneously applying the given timing signal to a second sampling network having a valid second-bit condition during a second tolerance interval following a second interval corresponding with a time space sequence representing the second bit spacing; deriving a first-bit datum when the next pulse of the train of pulses following the given timing signal occurs during the first tolerance interval; deriving a second bit datum when the next pulse occurs during the second tolerance interval; arranging each derived first-bit datum and second-bit datum serially in the sequence of their occurrence to develop a word; and reading the word.

Other objects of the invention will, in part, be obvious and will, in part, appear hereinafter. The invention, accordingly, comprises the apparatus and method possessing the construction, combination of elements, arrangement of parts, and steps which are exemplified by the following detailed disclosure.

For a fuller understanding of the nature and objects of the invention, reference should be had to the following detailed description taken in connection with the accompanying drawings.

BRIEF DESCRIPTION OF THE DRAWINGS

FIG. 2 is a block diagram of a code reading system incorporating the enhancement feature of the invention;

FIGS. 6A-6C combine to provide an electrical schematic diagram of the circuit components of the invention;

FIG. 7 is a chart showing a selection approach for incrementing and decrementing procedures according to the invention;

FIG. 8 is a chart showing arithmetic logic conditions whereby incrementation and decrementation according to the invention is achieved; and FIG. 9 is a chart showing logic conditions for special cases of overrun and underrun associated with the control circuit of the instant invention.

DETAILED DESCRIPTION OF THE INVENTION

Figure 1:
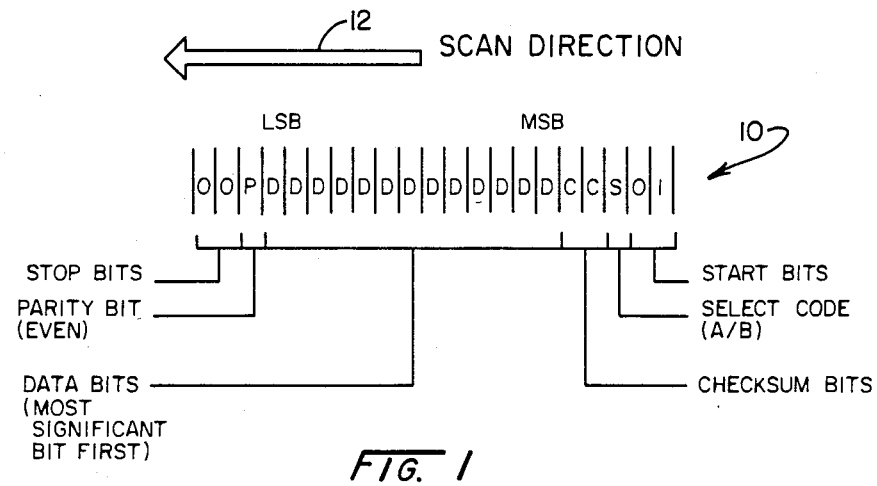
FIG. 1 is a diagrammatic representation of an exemplary bar code.

In its preferred embodiment, the method and corresponding circuit of the present invention is utilized in conjunction with the earlier-discussed video based code reading system. That system is described in detail in a United States patent entitled "Code Reader", U.S. Pat. Ser. No. 4,680,457 issued Jul. 14, 1987, by Robertson and assigned in common herewith. For many applications, the instant circuit is developed as an additional PC board employed with that system. Thus, an understanding of the invention may be enhanced by looking to background information concerning the reading technique of the video-based "Numbra" code reader. This reader can be utilized with a broad number of code designs which preferably are binary, the distinction between a binary 1 value and a binary 0 value generally residing in the video timing between the edges of adjacent ones of the code component bars. In this regard, a unit spacing between edges, which are seen as transitions in the resultant video signal, is designated to represent a binary "0". Correspondingly, a doubling of that spacing, or two units between adjacent or sequential transitions is designated to represent a binary "1". Referring to FIG. 1, a representation of the components of an exemplary code is schematically revealed. The figure does not show edge spacing but is provided to demonstrate the functional assignment of bits comprising the code. Shown generally at 10, the code is of a 21-bit extent comprised of 22 bars which may be formed integrally within or by ink jet or stamping or other means into the product to be identified. Code 10 is scanned in the direction shown by arrow 12 to provide an input to the reader system which commences with the start bits 1, 0 as labelled, following which a code select bit and checksum bits are provided. Following these entry bracketing bits the code provides binary data commencing, for example, with the most significant bits (MSB) and leading them to the least significant bits (LSB). Note that these data bits are labelled "D". The data presentation then is followed by a parity bit, labelled "P" following which, an indication that the code has ended may be provided by two bits labelled "stop bits".

The enhancement technique of the instant invention functions with such codes, the bars of which may be formed of spaced dots and it further may be employed to improve the decoding of fully formed bar codes where portions of the bars thereof may be damaged or missing. Looking to FIG. 2, a block diagrammatic representation of a video code reader is illustrated. In the figure, an item which is being industrially tracked is represented by the block 14. This item has sprayed, integrally formed within or indented therein a sequence of code components as represented generally at 16. As the item 14 is conveyed in the course of movement through the production process, as represented by the arrow 18, it is surveyed by a video camera 20. Camera 20 has the capability of imaging a significant portion of the item 14 and serves to generate an image typically providing a raster having a width of 400 pixels and a height of 262 pixels, i.e. the frame of a standard television image. That entire image is analyzed, line-by-line, to locate a valid code. The code then is analyzed for legality and decoded. Because every line width of the raster is analyzed, the code can be located even though its position varies on item 14 and a plurality of readings of the transitions represented by light-to-shadow will be generated for the code to develop a desirable reading redundancy. Because this scanning occurs at video rates, the code reader system must operate in conjunction with a data-string occurring at a rate of about 4 MHz and, thus, the typical techniques of analyzing bar codes employing the computational power of computers with respect to each bar cannot be resorted to. In effect, the extracted signal is the equivalent of a data rate of about two million baud.

The procedure for carrying out extraction of the code now contained within the video signal emanating from camera 20 initially involves a signal treatment wherein the rapid, light-to-dark image signal transitions are detected and digital logic pulses are generated in conjunction with each such transition. Accordingly, the output of camera 20 is conveyed in conventional fashion, for example via a coaxial cable 22 to a differentiation network represented by block 24. Generally this output at cable 22 will be an RS-170 type video signal. Network 24, in effect, serves as a passive, high-pass filter and this differentiation procedure functions to immediately resolve any background effects by looking only to the rate of change represented by a light-to-dark transition. This signal treatment represented at block 24 further includes a high speed voltage comparator which provides a thresholding function providing noise rejection.

The thus-treated sequence or train of code defining transition signals then is directed via data in line 26 to a transition signal enhancement circuit represented by block 28. This circuit incorporates the instant invention and will be seen to enhance the transition signals by electronically expanding them in what may be considered a vertical columnar fashion down the raster of the video imaging system. The thus-enhanced transition signal train of pulses then is directed through data out line 30 to be introduced to the initial stage of a multistage sequencer represented at block 32. Sequencer 32 is formed of a cascade connected sequence of retriggerable multivibrators or timing stages from first to a sampling stage which form a digital delay line having select outputs or pulse occurrence timing signals which are sampled by a sampling network though a series of connections represented by arrow 34. This bit discriminator or sampling network as represented generally at 32 functions to determine whether the interval of occurrence between adjacent pulses of the incoming pulse train corresponds with valid bit or transition signal spacings. These valid bit spacings will correspond with that time which is known to occur between the edge spacings of a valid "1" bit or a valid "0" bit. A timing interval representing a "1" bit will be substantially twice the interval of a spacing representing a "0" bit. To identify this time defined spacing, network 32 incorporates two selectively timed sampling subnetworks of monostable multivibrator-latch combinations which carry out a discrimination process for determining the presence of a 0 bit and a 1 bit which are depicted, respectively, at blocks 36 and 38. Networks 36 and 38 simultaneously receive select pulses from the sampling stage of sequencer 32 and serve to time-out an interval corresponding with a 0 bit and a 1 bit following receipt of the sampling transition pulse. These time-out intervals may be referred to, respectively, as "first-bit" and "second-bit" conditions. In the event that a next pulse or transition then falls within a window of acceptance or tolerance interval following those time-outs, then an appropriate output or respective first-bit datum or second-bit datum, is provided as represented by one arrow of the pair 40 and 42 extending, respectively, from networks 36 and 38. Outputs representing transition detection at arrows 40 and 42 are directed to a combination logic network represented at block 44. This network performs in conjunction with the output, as represented at line 46, of an error detect function represented at block 48 to develop DATA, PARITY, and CLOCK signals as represented at arrow 50. Error detect function 48 responds to the outputs of the multistage sequencer 32 as represented at arrow 34 to provide an initial test of the legality of the bits being produced.

The serial train of bits or transition signals (first-bit datum and second-bit datum) identified as DATA, are submitted to a serial-to-parallel alignment network represented at block 52. The principal component of this network is a shift register which is arranged to receive the pulse transitions representing a valid bar code and to provide a serial-to-parallel bit alignment to develop a binary word. This register is clocked by a clock input asserted from the logic network 44 and the parallel alignment of the register retained data then is tested for validity, as represented at arrow 54 and block 56 at a test logic network. The alignment network represented at block 52 further includes a parity counter which receives a PARITY signal from network 44 to determine the appropriateness of any given code from a parity bit standpoint. Network 56 also is seen to receive any ERROR signal input as represented a line 58 which may have been developed by the error detect function 48.

Figure 3:
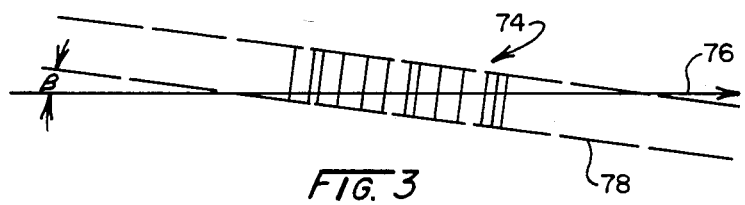
FIG. 3 is a schematic representation of a code reading condition employing a horizontal scan line and wherein the code is canted.

The extraction of a sequencer of bits or transition signals representing a bar code also involves a requirement for determining that there is a quiescent period at the commencement of any given valid bar code and at the end of it. To establish the presence or absence of this quiescent period, the last multivibrator stages of the sequencer 32 are employed to develop signals representing QUIET AT START and QUIET AT END which are directed additionally to the test logic network 56, as represented by arrow 60. In the event that the logic network 56 deterines that a valid code read is present, then there is a communicating signal identified as DATA READY which is presented, as represented at multi-directional commuication line 62, to a microprocessor driven control which is represented at block 64. The microprocessor control 64 responds to the parallel bit information from the shift registers of network 52, as represented by arrow 66, to generate a code identifying output along an appropriate parallel output represented by arrow 68. The processor control also evolves a SEARCH signal which is asserted via line 62 to the test logic network 56 for purposes of adjusting its components to receive a next code read. In turn, the logic network 56 develops a RUN signal which is represented at arrow 70 and is seen to enable the sequencer 32. For the purpose of control over the enhancement circuit represented at block 28, the processor control may provide a processor reset signal as represented at arrow 72.

Where codes are provided on items as at 14 with fully formed and continuous bars, then the probability remains high that a horizontal scan line of the RS-170 signal from camera 20 will intersect each of the bars and provide a valid reading, even though the code may be tilted slightly from horizontal. This is illustrated in FIG. 3 wherein a fully formed bar code representation 74 is shown intersected by a video horizontal scan line 76. Note that the perpendicular read direction represented by dashed line 78 of the code 74 is tilted with respect to the horizontal scan line by an angle, B. Notwithstanding this tilt, the scan line 76 is capable of intersecting each of the bars of code 74.

Figure 4:
FIG. 4 is a schematic representation of a condition similar to that of FIG. 3 only employing a dot formed code.
Figure 5:
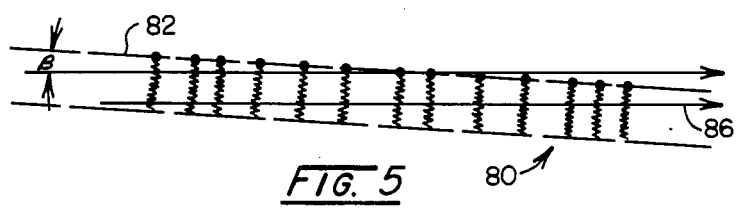
FIG. 5 is a schematic representation of the horizontal scan reading approach with the dot code of FIG. 4 and showing the operational effect of an ehnancement in accordance with the instant invention.

If, on the other hand, it is desired to read a code of the same variety which is formed of dots instead of bars, then the probability of a horizontal scan line intersecting each dot within the linear code diminishes considerably. Looking to FIG. 4, this situation is portrayed, a linear array of code forming dots represented at 80 being shown aligned along an axis 82. Should this axis 82 be tilted by the earlier noted angle, B, then a horizontal scan line as represented at 84 will be seen to miss significant numbers of the elements of the code and provide an illegal reading. The transition signal enhancement feature of the instant invention, as generally referred to at block 28 in FIG. 2, and depicted in FIG. 5 functions to electronically "stretch" each of the dots within such a linear code as at 80 in a columnar fashion such that a given sequence of horizontal scan lines, for example including scan line 86, will develop signal transitions corresponding with a legal reading of the code 80. The feature additionally will be seen to improve formed bar code reading procedures where such codes may have bars which have been degraded in production or transportation processes.

Figure 6A:
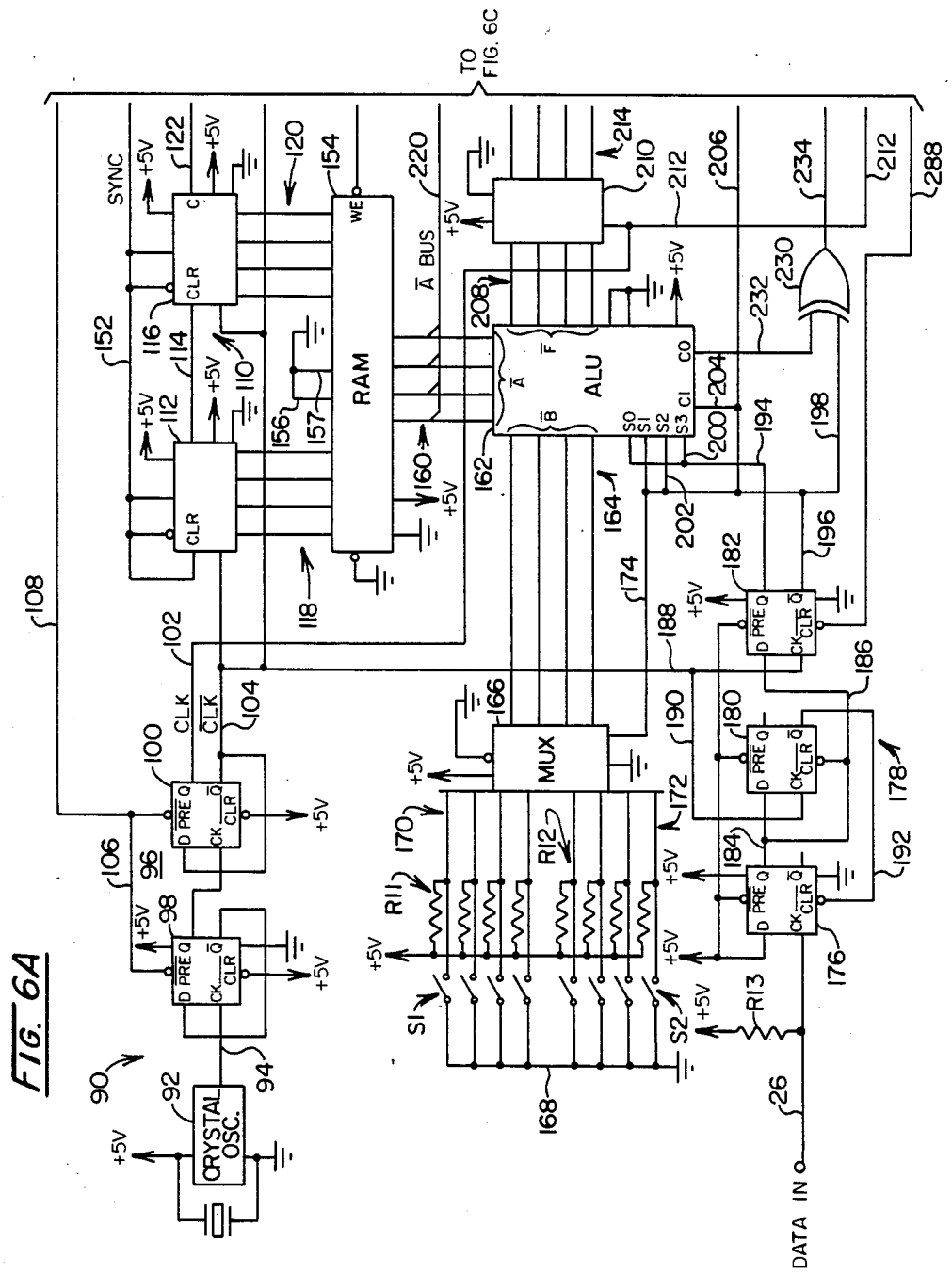
Figure 6B:
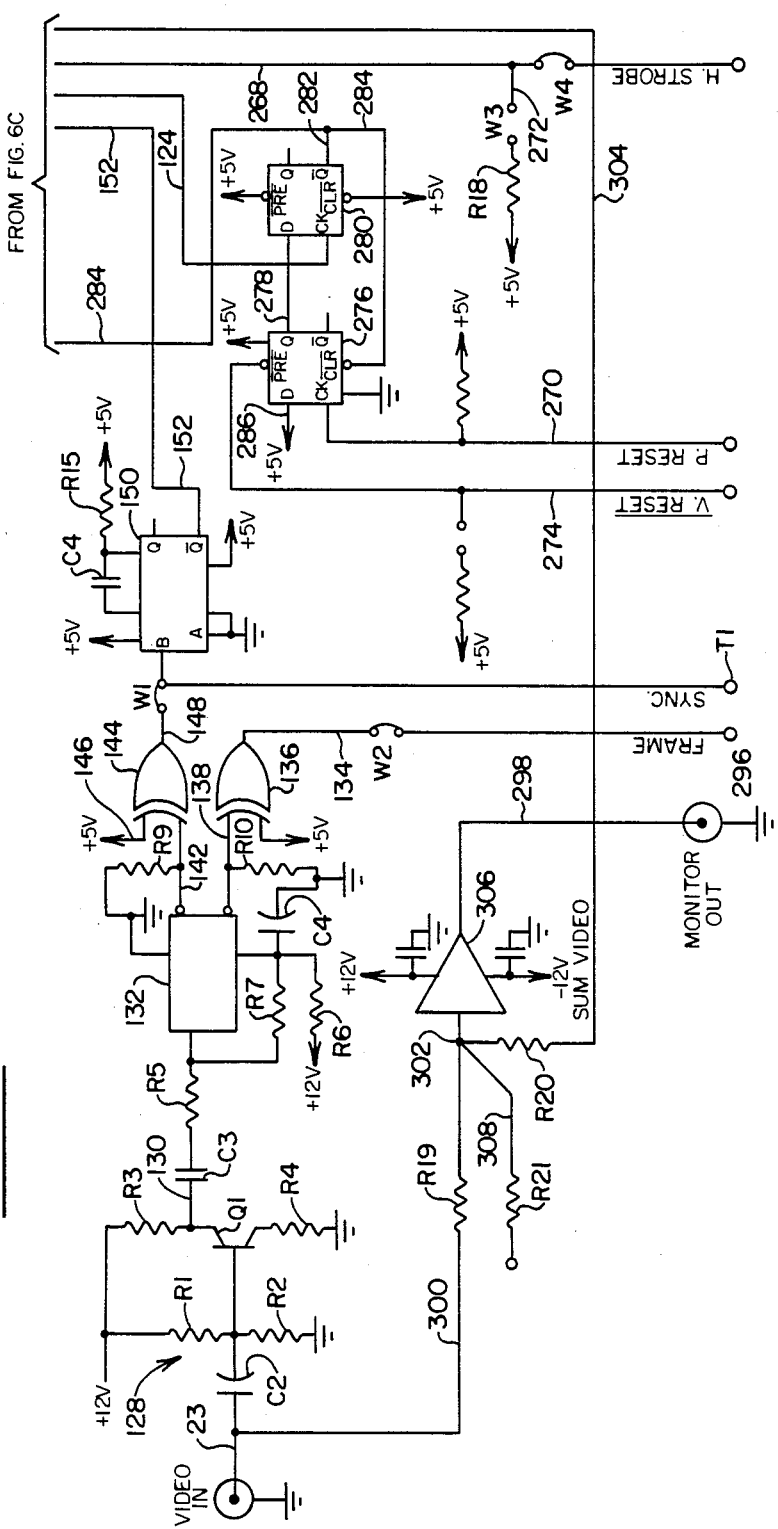

Referring to FIGS. 6A-6C, the circuit by which the enhancement method of the instant invention is achieved is revealed in electrical schematic fashion. This circuit functions to derive a sequence of 256 column memories within the time domain of a horizontal video scan. To develop this sequence of memory columns, a clock generating network is provided as represented in FIG. 6A in general at 90. The network 90 includes a crystal clock oscillator 92 which is free running at a nominal 20 MHz frequency. This stable output is provided at line 94 which is shown directed to the input of a two-stage frequency divider represented at 96. Divider network 96 is comprised of two "D" type flip-flops 98 and 100 which are coupled in cascaded fashion and function to provide serially disposed divide-by-two components such that the output of network 96 at the Q and $\overline{Q}$ terminals shown, respectively at lines 102 and 104, are simultaneously occurring two-phase clocks. Note that the signal at line 102 is labelled "CLK" while that at 104 is labelled $\overline{CLK}$. These clock signals occur at a 5 MHZ, i.e. 0.2 microsecond period. An important aspect of the network 96 resides in the ability to stop and start the clock generating network 90 by the assertion of an appropriate signal presetting flip-flop 98 from line 106 and flip-100 from commonly connected line 108. In this regard, a logic low presets flip-flops 98 and 100 and a logic high, presented to the preset terminals, functions to start the clock network 90.

The output of network 90 at line 104 is directed to the input of a counter network represented generally at 110 and including a lower significance four-bit counter 112, the carry output of which at line 114 is coupled to the input of a higher significance counter 116. Provided, for example, as type 74LS161 counters, components 112 and 116 combine to provide a 8-bit output represented, respectively, at output line groupings 118 and 120. Thus, outputs at line groups 118 and 120 can establish or identify 256 unique memory addresses corresponding with the inputting of 256 clock pulses from line 104. These pulses thus provide memory addresses within a time domain which function to, in effect, divide up a horizontal scan line of the video raster during the interval of its occurrence. Following the occurrence of the 256th pulse, the carry output of counter 116 at line 122 functions to disenable counters 98 and 100. This is achieved by a low logic level at line 122 which is coupled through line 124 to NAND gate 126, the output of which is provided at earlier-described line 108 leading to the preset terminals of flip-flops 98 and 100.

Looking momentarily to FIGS. 2 and 6B, the RS-170 video signal from camera 20 also is seen to be directed along line 23 to the instantly considered enhancement circuit. FIG. 6B shows this "VIDEO IN" composite signal being directed through a filter stage represented generally at 128 and including capacitor C2, resistors R1-R4 and NPN transistor Q1. So constructed, the network 128 functions to amplify and limit the frequencies contained within the composite video signal to a convenient band which is amenable to separation into its vertical and horizontal synchronizing components. The thus filtered and inverted signal then is presented along line 130 through coupling capacitor C3 and input resistor R5 to the input of a sync separator 132. Coupled to +12 v supply through resistor R6, the separator 132 may be provided, for example, as a type TVA 950-2 and is shown having a resistor R7 connected between its input and +12 v. The vertical sync signal is generated at line 134 as an active high pulse from the output of an exclusive OR gate 136, the input to which is derived from separator 132 via line 138 which is, in turn, coupled to ground through resistor R10. A bias capacitor C4 is located intermediate resistor R7 and ground. The opposite input to gate 136 is coupled via line 140 to +5 v. In similar fashion, the horizontal sync signal is isolated by separator 132 to provide a corresponding active low output signal at line 142. Line 142 is coupled to ground through resistor R9 which is, in turn, coupled to the separator 132. Line 142 extends to one input of exclusive OR gate 144, the opposite input to which is coupled through line 146 to +5 v. Gates 136 and 144 act as buffers and inverters. The active high output of gate 144 at line 148 is connectable through a jumper W1 to the B terminal input of a one-shot (monostable multi-vibrator) 150. As an alternate arrangement, an externally derived horizontal synch signal may be provided from terminal T1 upon removal of jumper W1. Accordingly, a pulse of definable duration (5 microsecond) is provided as occurring at the $\overline{Q}$ output of one-shot 150 at line 152 at the falling edge of the horizontal synch output at line 148. This may be seen to start the counter sequence close to the beginning of active video time.

Returning to FIG. 6A, counter network 110 is started or enabled with each horizontal scan line of the RS-170 generated video signal upon the occurrence of an active low signal representing a horizontal sync pulse at line 152. The counters then generate 256 discrete memory address outputs or signals at lines 118 and 120 over the interval of the ensuing horizontal video scan line. Following the generation of the last or 256th memory address within the time domain of the horizontal scan, the carry out terminal of counter 116 at line 122 assumes a logic high and the resultant signal is directed through gate 126 and lines 108 and 106 to stop the divider network 96. The clock sequenced 256 addresses occur over an interval of 51.2 microseconds. This interval may be compared to the active video section of a standard RS-170 video signal which is approximately 52 microseconds. Thus, essentially the entire active video segment of each horizontal scan is available to develop the column memories or addresses which are directed to random access memory (RAM) 154. RAM 154, which may be provided as a type 2114-AL, is organized as 1 K×4, however, two address inputs as at lines 156 and 157 are tied to ground such that there are 256 locations of memory which are utilized. Enabled from a write enable (WE) terminal from line 158, the RAM 154 provides a 4-bit output/input at line grouping 160 coupled with its binary word access terminal.

The method of enhancement employs the RAM 154 to establish historical memory data as to edges or transitions representing code information which occurred "recently" during the interval of address provided from counter network 110. Thus, vertical "columns" in a time domain are generated with edge or transition information, i.e. the memory retains past occurrences of edges within a given column. Horizontal scans occurring in a given video field number 262½ and thus a significant amount of information is dealt with in the course of code extraction and a form of electronic expansion or "stretch" is developed as described in conjunction with FIG. 5.

The information within RAM 154 for each of the 256 addresses, when provided from output line grouping 160, is arithmetically treated by a high speed arithmetic logic unit (ALU) 162. Provided, for example, as a type 74LS181, the arithmetic unit 162 responds to both the presence and absence of an edge or transition for a particular time domain established address and performs a corresponding addition or subtraction of a selected arithmetic value. This then evolves a binary number value corresponding with the presumptive state of occurrence of such edge transition. Where no transition or edge is detected, then a decrement or substraction function is carried out while, conversely, where an edge is detected, then the binary value stored within RAM 154 for the given column or address location is incremented by a selected amount. Thus, the ALU 162 has two inputs, one at line grouping 160, designated $\overline{A}$ and the other at a four line grouping 164, designated $\overline{B}$. Line grouping 164 carries a 4-bit word having an arithmetic value selected for either incrementing or decrementing the addressed value from RAM 154 and is seen to extend as the output of a multiplexer 166. The inputs to multiplexer 166 include a 4-bit increment code established by the operator selection of appropriate switches within the grouping of four thereof indicated at S1. Similarly, a 4-bit decrement code is elected by the operator by appropriate selection of the switches within a four switch grouping thereof represented at S2. One side of each of switches S1 is coupled to ground via line 168, while the opposite terminals thereof extend through line grouping 170 to the input of multiplexer 166. Each of the lines within four line grouping 170 contains a pull-up resistor, the grouping thereof being represented at R11. Similarly, one terminal of each switch of grouping S2 is coupled through line 168 to ground, while the opposite terminals thereof are coupled through corresponding four line grouping 172 to the inputs of multiplexer 166. As before, a pull-up resistor of the group R12 thereof is coupled with each of the lines within the four line grouping 172 and to +5 v. An election of whether an increment or decrement code is to be selected is made upon the basis of the detection of a transition within a particular time domain column of memory as addressed at RAM 154. This election causes an appropriate selection to be made at multiplexer 166 through line 174.

The election by which an incrementation or decrementation function is carried out by ALU 162 is determined by a "presentment" signal representing the presence or absence of a transition or edge at the DATA IN signal described in conjunction with FIG. 2 at line 26. This line 26 again is reproduced in FIG. 6A and is seen to be coupled with +5 v through pull-up resistor R13 and directed to the clock input terminal of a D-type latch or flip-flop 176. Flip-flop 176 is part of of a signal treatment and clock synchronization network represented generally at 178 and including the same form of flip-flops 180 and 182. The enhancement procedure of the invention commences when a positive going pulse edge is received at line 26. This pulse is the result of a video scene "edge" or transition which has been differentiated as described in conjunction with block 24 in FIG. 2 and thresholded. Latch 176 is set by this positive going edge and the Q terminal thereof at line 184 assumes a logic high. This logic high is also witnessed by virtue of line 186 at the D terminal of latch 182. The clock inputs of latches 180 and 182 are coupled to simultaneously receive the clock, $\overline{CLK}$ signal from lines 104, 188 and 190. Accordingly, upon the next occurring $\overline{CLK}$ positive going signal at line 190, latch 180 clears latch 176 by virtue of the coupling of its $\overline{Q}$ terminal via line 192 with the $\overline{CLR}$ terminal of latch 176. Thus, latches 176 and 180 act to hold edges of the impressed data until the next positive going edge of the system clock. This next positive going edge of $\overline{CLK}$ also sets latch 182 if latch 176 had been set. It may be observed that the use of the crystal driven clock 92 assists in using the "Numbra" reader which has fixed timing windows for code "0's" and "1's" to read high density codes because there is an assured regularity of the signal in a time domain.

Latch 182 performs as a buffer to the ALU 162 and its Q terminal exhibits a logic high at line 194 in the event that the system has detected an edge transition within the time domain interval of a given clock signal ($\overline{CLK}$). Similarly, where no edge or transition is detected from line 26, then the $\overline{Q}$ terminal of latch 182 assumes a logic high which is exhibited at lines 196 and 198. The Q and $\overline{Q}$ output of latch 182 are employed as presentment signals for the principal purpose of submitting increment and decrement commands to multiplexer 166 and ALU 162. In this regard, note that line 194 extends to the S0 control input and through line 200 to the S3 control input of ALU 162. Correspondingly, line 196 from the $\overline{Q}$ terminal of latch 182 extends through lines 198, 174 and 202 to the S1 and S2 control terminals of ALU 162. Additionally, line 174 is seen to extend to the increment/decrement code select input of multiplexer 166. Accordingly, upon the occurrence of an edge or transition and the appropriate synchronizing clocking thereof, multiplexer 166 is commanded to supply an increment code from the selection of switch grouping S1 through line grouping 164 to the $\overline{B}$ inputs of ALU 162. Correspondingly, with the occurrence of a clock pulse and the absence of a transition or edge at line 26, then the decrement code as developed by switch groupings S2 is selected by multiplexer 166 for assertion at the $\overline{B}$ terminal of ALU 162. Referring momentarily to FIG. 7, the logic thus described in conjunction with network 178, ALU 162 and multiplexer 166 is diagramed in the interest of clarity. Note that the diagram also identifies a Carry In terminal (CI) of ALU 162 and the state thereof. This terminal may be observed in FIG. 6A as being coupled through lines 204 and 206 to line 198. This carry-in bit is set to a logic high in the presence of an incrementing condition and a logic 0 in the absence of such incrementing condition.

With the arrangement shown, multiplexer 166 functions to provide an operand of binary value selected by the user which is asserted at the $\overline{B}$ input of ALU 162 from line grouping 164. ALU 162 then performs an arithmetic function based upon this operand wherein it will increment its $\overline{A}$ input from RAM 154 if a positve edge was detected at DATA IN line 26 within the previous clock cycle; or the operand will contain a binary value presenting how much the $\overline{A}$ input of ALU 162 is to be decremented if a positive edge or transition was not detected at the data in line 26 during the previous clock cycle. ALU 162 is internally programmed to provide an output, $\overline{F}$, given the inputs $\overline{A}$ and $\overline{B}$ such that A input value is incremented by (B+1) in an incrementing procedure or the A input value from line grouping 160 is decremented by (B+1). This relationship is revealed in FIG. 8 and, it may be noted that the values employed with the system are inverted to provide negative true logic.

Returning to FIG. 6A, it may be observed that the $\overline{F}$ output of ALU 162 is limited to a 4-bit extent and is represented at line grouping 208. Thus, as the enhancement technique progresses through a horizontal scan of data, the memory at RAM 154 is addressed and certain of those addresses will have a stored value representing earlier edges. If an additional edge or transition is detected for that address location, then the value of the increment code is added to it and, conversely, where no edge is detected for that particular address, then the value of the memory is decremented by the amount of the decrement code. If an edge or transition is repeatedly extracted with respect to a given address a larger and larger value is built-up at that address within the memory at RAM 154. Conversely, where no edge is extracted for such given address, then the arithmetic value stored thereat is diminished.

The path by which the computed value $\overline{F}$ is written into RAM 154 includes line grouping 208 which extends to the input of a latch 210. Latch 210, which may be provided as a type 74LS175, is set to the $\overline{F}$ data from the ALU 162 on the rising edge of the signal, CLK, developed from line 102 and extending to latch 210 via line 212. It may be recalled that the $\overline{A}$, $\overline{B}$, and S0 through S3 inputs to the ALU 162 were set-up earlier on the rising edge of the signal $\overline{CLK}$. Latch 210 thus is employed to latch the valid results of an addition or subtraction at ALU 162. The latching function is necessitated, inasmuch as when the information commences to be written back to the RAM 154, the same information is provided at the $\overline{A}$ input of the ALU 162. This would tend to change the value thereat. Therefore, the data is saved at latch 210. The output of latch 210 is provided at 4-bit line grouping 214 which, looking additionally to FIG. 6B, extends to the input of a bus driver or tri-state buffer 216. Provided, for example, as a type 74LS365, the driver 216 provides a 4-bit output at line grouping 218 which is coupled to a bus labelled "$\overline{A}$ BUS", as representd at 220. Bus 220 is seen to extend to the 4-bit output at line grouping 160 of RAM 154 (FIG. 6A). The information carried by bus 220 is written into RAM 154 upon the occurrence of a write enable (WE) input from line 158, which will be observed to be derived as a low going logic signal at line 222. Line 222 extends to +5 v through pull-up resistor R14.

Under some circumstances, for example where numerous consecutive transitions are detected for a given column memory or where numerous occurrences of no transition are witnessed, then respective underruns or overruns of the binary values developed by ALU 162 will be encountered. In this regard, should a binary number such as 0110 be added with an increment code of, for example 1011, the result will be 10001, representing a carry out of 1. The resultant value which would be stored in RAM 154 as 0001, a value smaller than the arithmetic operation commenced with. To guard against this overrun as well as the correspondingly encountered underrun in the case of decrementation, a word control technique of the invention imposes maximum or minimum values. For example, the approach "forces" the answer "$\overline{F}$"(FIG. 8) to either the maximum $\overline{F}=0$ (case 1 where an increment is called for but an overrun occurs) or to the minimum $\overline{F}=F$ (Hex) for a case 2 where a decrement is called for and an underrun occurs, it again being recalled that the values presented to RAM 154 are active low or inverted.

Looking to FIG. 6A, a determination as to whether one of the special overrun or underrun cases occurs is orchestrated by an exclusive OR gate 230. One input to gate 230 is developed from line 232 which extends, in turn, to the carry out (CO) terminal of ALU 162. This carry out terminal provides a logic 1 signal in the presence of an overrun and maintains a logic low value in the event of an underrun. The opposite input to gate 230 derives from line 198 which reflects the logic level at line 196 representing the $\overline{Q}$ output of latch 182. It may be recalled that this output, in effect, represents $\overline{EDGE}$ or no transition and it is a signal which, additionally, is directed to the S1 and S2 terminals of ALU 162. Accordingly, two special cases will occur as are illustrated in FIG. 9 wherein, for a case 1, representing an incremental count with overrun, then S1, S2 will equal 0 and the CO terminal will have a logic 1 value. On the other hand, as shown in special case 2, where a decrement procedure is involved with underrun, then terminals S1, S2 will be logic 1's and the carry out terminal signal of ALU 162 will be 0 representing a borrow out. For the special case 1, wherein a logic low at line 198 is exclusively ORed with a logic 1 at line 232, then the output of exclusive OR gate 230 at line 234 will be a logic high. Looking additionally to FIG. 6C, line 234 is seen to be directed to the D terminal of D-type latch or flip-flop 236. Flip-flop 236, in turn, is set by the next rising edge of the signal, CLK, emanating from lines 102 and 212 (FIG. 6A). By using this signal, CLK, to toggle the latch 236 so as to sample the developed data, there is assurance that the special cases as illustrated in connection with FIG. 9 will be tested after the pertinent arithmetic operation has been attempted but before any change is asserted at RAM 154 (on the next $\overline{CLK}$ positive edge). The Q and $\overline{Q}$ outputs of flip-flop 236 are provided, respectively, at lines 238 and 240. These outputs function to select one or the other of tri-state buffers or bus drivers 216 or 242. These drivers are negative true enabled at their OE terminals and, thus, for the special case of an overrun, the $\overline{Q}$ of flip-flop 236 at line 240 will serve to enable driver 242 while withholding enablement at driver 216. As this occurs, the signal at line 206 emanating from the $\overline{Q}$ output of flip-flop 182 (S1,S2) is at a logic low which is presented as 4-bit 0 input to bus driver 242 from four line grouping 244. The corresponding output of driver 242 is provided at four line grouping 246 which is coupled to $\overline{A}$ bus 220 for presentation to RAM 154. Drivers 216 and 242 have parallel connected or tied gates as represented by lines 222 and 222a which function to pull the write enable (WE) of RAM 154 low with an appropriate delay when either of the drivers 242 or 216 is active.

Under underrun conditions, driver 242 again will be selected while driver 216 is rendered inactive and the input at line 206 and four line grouping 244 will be a logic high. The resultant output, then, is applied to $\overline{A}$ BUS 220 from line grouping 246. It may be recalled that the logic is inverted, and thus the 4-bit grouping of 1's represents a lowest value and a corresponding 4-bit grouping of 0's represents a highest or F (Hex) value, $\overline{A}$ BUS being an active low or inverted bus. Under all arithmetic cases other than the special cases described above, the flip-flop 236 will enable bus driver 216, while rendering bus driver 242 inactive.

The column memory value generated at $\overline{A}$ BUS 220 is evaluated by a magnitude comparator 248, the 4-bit input to which from bus 220 is provided at four line grouping 250. Provided, for example, as a type 74LS85, the comparator 248 functions as a digital thresholding device, the threshold value of which is inserted as a 4-bit binary, valid low input from switch grouping S3, one terminal of each switch of which is coupled to ground through line 252 and the opposite terminals of which are coupled to four line grouping 254 which, in turn, are coupled through pull-up resistors to +5 v through line 256. Whenever the value at line grouping 250 is less than the value of the data provided through the switch groupings S3, a high output will be provided from the comparator 248 at line 258. Line 258, in turn, is directed to one input of an AND function gate 260, the output of which at line 262 is directed to the A terminal input of a monostable multivibrator or one-shot 264. Device 264 is configured by appropriate election of values of potentiometer R16 and resistor R17 in combination with capacitor C5 to provide a predetermined output period at line 266 representing "DATA OUT". this period may be elected, for example, as 0.3 microsecond to permit the "spanning" of two columns of memory to thereby form a gapless "bar" in the horizontal scan direction. This signal "DATA OUT" is the desired signal which may be employed by the NUMBRA system and is represented at line 30 in FIG. 2.

AND function gate 260 permits a desirable horizontal "windowing" in conjunction with the output of the enhancement system. Note that, of the three inputs to gate 260, its input at line 266 is retained continuously at a logic high +5 v and, as long as the input thereto from line 268 remains at a logic high level, then the gate 260 is toggled each CLK cycle to effect the above-discussed toggling of monostable multivibrator 264.

Line 268 is seen to extend to FIG. 6B wherein it is labelled "H.STROBE". This is an external input which provides for an external inhibition of the enhancement function. For example, if this "H.STROBE" signal at line 268 is active high only for a portion of each horizontal scan line of the RS-170 signal at line 23, the system will, in effect, create a viewing window during which the enhancement or stretching of the dot or bar can occur. As is apparent, the modulation otherwise provided through line 268 can be avoided by removing jumper W4 and inserting jumper W3 at line 272 which is coupled through resistor R18 to +5 v. Vertical limitation can also be provided such that the amount of enhancement is contained essentially within a "box" established at the TV raster. By so modulating the input to gate 260 from line 268, the enhancement circuit may be employed to deal with a scanning situation wherein an excessive amount of noise surrounds the dot code image. This approach may be employed to limit the extent of such noise and deal only with the dot or similar components of the code itself. Inasmuch as the Numbra system which employs the output of the instant circuit utilizes a clear or quiet space at the front and back of the code, the modulation at line 268 can aid in generating those necessary quiet intervals by artificially disabling the output of a detection of edge unit essentially the position whereat a dot or commencement of the code occurs. Essentially the same approach can be used in the vertical sense in conjunction with line 270.

RAM 154 is cleared by the assertion of, in effect, 0 values at each of its 256 memory locations in conjunction with select vertical parameters of the video raster. Looking to FIG. 6B, a vertial reset ($\overline{VESET}$/) input is provided at line 274. This signal is developed "off board" and may be provided, for example, in conjunction with the vertical sense signal of the RS-170 video input. Alternately, the signal may be developed specifically for any given coding condition wherein it is desired to clear RAM 154. A momentary logic low signal on line 274 will function to preset a D-type latch 276 which is employed as an RS flip-flop. The resultant output of the Q terminal of latch 276 at line 278 is a logic high which is presented to the D terminal of an identical latch 280. This signal at line 278 is clocked into latch 280 by the next high going carry out of counter grouping 110 at line 122. Note that line 122 extends from counter 116 to line 124 (FIG. 6C), thence to the clock input of latch 280 (FIG. 6B). When so clocked, the $\overline{Q}$ output of latch 280 at line 282 assumes a logic low value. This logic low is transmitted to line 284 which provides a clear memory request signal and, additionally, by virtue of its coupling with the CLR terminal of latch 276, effects an immediate clearing of the latter. This same form of clear memory request as developed from latch 280, may be developed from a processor reset signal (P RESET) at line 270. When a low-to-high logic transition occurs at line 270, latch 276 is set such that it clocks in the 5 volt input thereto from line 286. The resultant logic high at line 278, is clocked, as before, into latch 280 upon the occurrence of a transition at line 124 from the counter grouping 110 representing the completion of a memory column defining horizontal count carried out by counter grouping 110. The peak reset signal at line 270 may be generated by the microprocessor based control described in conjunction with block 64 in FIG. 2. Thus, a considerable amount of latitude is given to the user to accommodate the enhancement technique to any given code reading situation in terms of establishing a vertical window of response. The clear memory request represented by the signal at lines 282 and 284 will continue, once developed, until the column counters 110 sequence from 0 to 255, representing an entire horizontal scan. During this interval, each write into RAM 154 will be a grouping of four 1's which, due to the inverted logic of the $\overline{A}$ BUS 220, will reset the system to a condition of no vertical column having a history of seeing and edge or a transition. In effect, each location in RAM 154 is decremented fully. Looking additionally to FIG. 6C, line 284 is seen to extend to the preset terminal input of flip-flop 236. Additionally, the same signal as carried at line 284 extends via line 288 to the clear terminal input of flip-flop 182 (FIG. 6A). Accordingly, during the interval wherein latch 280 exhibits a clear memory request condition, then flip-flop 182 is cleared such that a no transition condition or logic high signal is present at line 196 which provides a logic high at line 206 which, in turn, is asserted as binary 1's at input line grouping 244 to bus driver 242. Simultaneously, the signal at line 284 is asserted at the preset terminal input of flip-flop 236 to effect a selection of bus driver 242 and thus assert the logic 1's at $\overline{A}$ bus 220. In view of the inverted logic employed, the resultant 1's effect a clearing of each of the memory locations of RAM 154 during an entire horizontal line count carried out by counter network 110. For many applications, line 274 will be coupled to receive the signal at line 134 for the noted vertical reset-RAM 154 clearing procedure. Normally, the P. RESET input at line 270 is coupled with the processor 64 as described in conjunction with line 72 in FIG. 2. Erasure, for example, can be carried out after the valid or good code read is obtained. This clearing is highly desirable whenever more than one code can exist in one raster or imaging region. In the latter regard, the P. RESET input at line 270 permits the processor 64 to control the search for an entirely new code sequence after the next horizontal scan has wiped out any previous memory column history.

FIG. 6B also reveals a MONITOR OUT terminal 296 extending from output line 298. This MONITOR OUT may be coupled to a video display for purposes of initial set-up and the like, the resultant raster revealing the occurrence of transitions or edges as large white stripes which represent the electronic stretching of the transition. The out put signal at line 298 is derived by combining the VIDEO IN signal from lines 23 and 300 as it extends through resistor R19 to a summing point 302 with A SUM VIDEO signal derived from output line 266 (FIG. 6C) as it extends via line 304 and resistor R20 to summing point 302. The summed signals are directed to the input of an operational amplifier 306 which may be for example a type LM31OH and provides the noted output at line 298. A test input also may be provided to summing point 302 via line 308 and resistor R21.

Since certain changes may be made in the above apparatus and method without departing from the scope of the invention herein involved, it is intended that all matter contained in the above description or shown in the accompanying drawings shall be interpreted as illustrative and not in a limiting sense.

I claim:

1. In a code reading system wherein imaging means for imaging at least a portion of a code carrying object and generating a sequence of line scan defined image output signals of given scan duration which include image transition signals occurring in a time spaced sequence corresponding with said code and which further includes line scan synchronization signals, the code signal enhancement circuit improvement comprising:
    oscillator means actuable for producing a timed sequence of pulsed signals;
    counter means actuable to assume a clear condition and responsive to said pulsed signals for deriving a sequence of address signals from first to last;
    memory means having a binary word access terminal and a sequence of address locations for selectively retaining arithmetic values, responsive to said address signals for providing at said access terminal arithmetic signals corresponding with said values at said address locations, and further responsive to said address signals and said arithmetic signals at said access terminal in the presence of a write enable condition to effect said retention of said arithmetic values corresponding with said arithmetic signals at said access terminal;
    signal treatment means responsive to said image output signals for deriving presentment signals representing the state of said occurrence of said image transition signals;
    means for deriving select arithmetic adjustment signals;
    logic circuit means responsive to said arithmetic signals at said access terminal, to said arithmetic adjustment signals and said presentment signals for varying the value of said arithmetic signals by the amount of said arithmetic adjustment signals selected with respect to said presentment signals to derive adjusted arithmetic signals at an output;
    comparator means responsive to a select arithmetic threshold value and to said adjusted arithmetic signals for deriving an enhanced said transition signal when said adjusted arithmetic signals exhibit a value at least as great as said threshold value; and
    distribution means for selectively conveying said adjusted arithmetic signals to said comparator means and said memory means.

2. The code enhancement circuit of claim 1 including:
    means for isolating said scan synchronization signals to provide a scan actuation signal; and
    means for actuating said scan counter means with said scan activation signal.

3. The code enhancement circuit of claim 1 in which said oscillator means includes:
    a crystal oscillator having an output of given frequency;
    divider means responsive to said crystal oscillator output for deriving said timed sequence of pulsed signals in first and second phases and actuable to an initial preset condition; and
    said counter means is configured to derive a carry output subsequent to the occurrence of said last address signal for effecting said divider means actuation to said initial preset condition.

4. The code enhancement circuit of claim 1 in which said signal treatment means is further responsive to said oscillator means pulsed signals to effect the synchronization of said presentment signals therewith.

5. The code enhancement circuit of claim 1 in which said signal treatment means includes means responsive to said oscillator means pulsed signals for deriving said presentment signals as a first signal representing the occurrence of a said image transtion signal during the occurrence of a said pulsed signal, and as a second signal representing no occurrence of a said image transition signal during the occurrence of a said pulsed signal.

6. The code enhancement circuit of claim 5 in which said logic circuit means is responsive to said signal treatment means first signal to increment the said value of said arithmetic signals by the amount of a select said arithmetic adjustment signal to derive said adjusted arithmetic signals, and is responsive to said signal treatment means second signal to decrement the said value of said arithmetic signals by the amount of a select said arithmetic adjustment signal to derive said adjusted arithmetic signals.

7. The code enhancement circuit of claim 6 in which said means for deriving select arithmetic adjustment signals comprises:
    first selectively switchable means for deriving a first said arithmetic adjustment signal as a binary word operand for said incrementation with said arithmetic signals, and
    second selectively switchable means for deriving a second said arithmetic adjustment signal as a binary word operand for said decrementation from said arithmetic signals.

8. The code enhancement circuit of claim 7 in which:
    said memory means binary word access terminal and said logic circuit means output are configured to operate upon a binary word of predetermined finite extent having a predetermined maximum arithmetic value;
    said logic circuit means provides a carry out signal in the event of an overrun at the said output occurring with a said incrementation of said first arithmetic adjustment signal with said arithmetic signals;
    said distribution means includes word control means for effecting the assertion of a said binary word of a predetermined maxium value to said comparator means and said memory means in substitution for said adjusted arithmetic signals.

9. The code enhancement circuit of claim 8 in which word control means is responsive to an underrun condition of said logic circuit means and to said signal treatment means second signal for effecting the assertion of a said binary word of a predetermined minimum value to said comparator means and said memory means in substitution for said adjusted arithmetic signals.

10. The method for enhancing the response of code reading systems of a type employing imaging means to image a code and generate a sequence of line scan defined image output signals having image transition signals occurring in a time spaced sequence corresponding with said code and having line scan synchronization signals, comprising the steps of:
generating a timed sequence of pulsed signals from a crystal oscillator;
generating a sequence of memory address signals from first to last in correspondence with said timed sequence of pulsed signals;
accessing a memory location having a predetermined binary word length capacity during the interval of each said memory address signal;
deriving a presentment signal representing the state of occurrence of a said image transition signal in correspondence with the said interval of each said memory address signal;
writing a binary word of first predetermined arithmetic value into each said accessed memory location upon the corresponding occurrence of a said presentment signal representing the presence of a said transition signal and, subsequently adjusting said first arithmetic value in correspondence with said presentment signal for subsequently occurring said line scan defined image output signals to derive adjusted arithmetic signals with respect to said memory locations; and
comparing said adjusted arithmetic signals with a select arithmetic threshold value and deriving enhanced transition signals when said adjusted arithmetic signals exhibit a value at least as great as said arithmetic threshold value.

11. The method of claim 10 in which said step of generating a sequence of memory address signals is restarted in response to a said line scan synchronization signal.

12. The method of claim 10 in which said presentment signals are derived as a first signal representing the occurrence of a said image transition signal during a said pulsed signal occurrence, and as a second signal representing no occurrence of a said image transition signal during the occurring of a said pulsed signal.

13. The method of claim 12 in which said binary word of first predetermined arithmetic value is subsequently adjusted upon the occurrence of said first signal by incrementing it by the value of said first predetermined arithmetic value to derive a said adjusted arithmetic signal, and is subsequently adjusted upon the occurrence of said second signal by decrementing it by a binary word of second predetermined arithmetic value to derive a said adjusted arithmetic signal.

14. The method of claim 13 in which said adjusted arithmetic signal is selected as a predetermined high equivalent arithmetic value when said incrementation by the value of said first predetermined arithmetic value creates a binary overrun condition with respect to said predetermined binary word length capacity.

15. The method of claim 13 in which said adjusted arithmetic signal is selected as a predetermined low equivalent arithmetic value when said decrementation by said second predetermined arithmetic value creates a binary borrow out condition with respect to said predetermined binary word length capacity.

16. The method of claim 10 in which said sequence of memory address signals are generated at about a 5 megahertz frequency.

17. A method of reading a code at the surface of an object provided as a word deriving sequence of radiation definable transitions selectively spaced in accordance with a predetermined ratio defining first-bit and second-bit information, comprising the steps of:
imaging said surface with a video device to generate a sequence of horizontal line scan defined image signals having transition signals occurring in a timed spaced sequence corresponding with said radiation definable transitions and having horizontal synch signals;
generating a timed sequence of pulsed signals from a crystal oscillator;
generating a sequence of memory address signals from first to last in correspondence with said timed sequence of pulsed signals;
accessing a memory location having a predetermined binary word length capacity during the interval of each said memory address signal;
deriving a presentment signal representing the state of occurrence of a said transition signal in correspondence with the said interval of each said memory address signal;
writing a binary word of first predetermined arithmetic value into each said accessed memory location upon the corresponding occurrence of a said presentment signal representing the presence of a said transition signal and, subsequently, adjusting said first arithmetic value in correspondence with said presentment signal for subsequently occurring said line scan defined image output signals to derive adjusted arithmetic signals with respect to said memory locations;
comparing each said adjusted arithmetic signal with a select arithmetic threshold value and deriving an enhanced output transition signal when said adjusted arithmetic signal exhibits a value at least as great as said arithmetic threshold value;
applying said enhanced output transition signals as a train of pulses to a sequence of timing stages from first to a sampling stage to establish a sequence of pulse occurrence timing signals;
applying a given timing signal associated with said sampling stage to a first sampling network having a valid first-bit condition during a first tolerance interval following a first interval corresponding with a said time spaced sequence representing said first-bit select spacing;
simultaneously applying said given timing signal to a second sampling network having a valid second-bit condition during a second tolerance interval following a second interval corresponding with a said time spaced sequence representing said second bit spacing;
deriving a first-bit datum when the next pulse of said train of pulses following said given timing signal occurs during said first tolerance interval;
deriving a second-bit datum when the said next pulse occurs during said second tolerance interval;
arranging each said derived first-bit datum and said second-bit datum serially in the sequence of their occurrence to develop a said word; and
reading said word.

18. The method of claim 17 in which said step of generating a sequence of memory address signals is restarted in response to a said horizontal synch signal.

19. The method of claim 17 in which said presentment signals are derived as a first signal representing the occurrence of a said image transition signal during a said pulsed signal occurrence, and as a second signal representing no occurrence of a said image transition signal during the occurring of a said pulsed signal.

20. The method of claim 19 in which said binary word of first predetermined arithmetic value is subsequently adjusted upon the occurrence of said first signal by incrementing it by the value of said first predetermined arithmetic value to derive a said adjusted arithmetic signal, and is subsequently adjusted upon the occurrence of said second signal by decrementig it by a binary word of second predetermined arithmetic value to derive a said adjusted arithmetic signal.

21. The method of claim 20 in which said adjusted arithmetic signal is selected as a predetermined high equivalent arithmetic value when said incrementation by the value of said first predetermined arithmetic value creates a binary overrun condition with respect to said predetermined binary word length capacity.

22. The method of claim 20 in which said adjusted arithmetic signal is selected as a predetermined low equivalent arithmetic value when said decrementation by said second predetermined arithmetic value creates a binary borrow out condition with respect to said predetermined binary word length capacity.

* * * * *